United States Patent [19]
Fu

[11] Patent Number: 5,499,875
[45] Date of Patent: Mar. 19, 1996

[54] BICYCLE HUB ASSEMBLY

[76] Inventor: Chueh-Kuo Fu, No. 74, Ssu-Yueh Rd., Tai-Ping Tsun, Hou-Li Hsiang, Taichung Hsien, Taiwan

[21] Appl. No.: 363,693

[22] Filed: Dec. 23, 1994

[51] Int. Cl.[6] ...................................... F16C 19/08
[52] U.S. Cl. ............................................. 384/545
[58] Field of Search ................................... 384/545, 544, 384/589, 431, 537, 542

[56] References Cited

U.S. PATENT DOCUMENTS

| | | | |
|---|---|---|---|
| 3,967,856 | 7/1976 | Beauchet | 384/545 |
| 4,412,706 | 11/1983 | Hopper | 384/545 |
| 5,106,210 | 4/1992 | Chi | 384/545 |
| 5,233,885 | 8/1993 | Lin et al. | 384/545 |

*Primary Examiner*—Lenard A. Footland
*Attorney, Agent, or Firm*—Renner, Otto, Boisselle & Sklar

[57] ABSTRACT

A bicycle hub assembly includes a hollow hub body having two enlarged end portions and two bearing assemblies mounted respectively in the enlarged end portions. Each bearing assembly has an inner ring, an outer ring and bearing elements confined between the inner and outer rings. The outer ring is in tight contact with the hub body. An elongated shaft passes rotatably through the hub body and is fixed to the inner rings. The elongated shaft has two ends extending outwardly of the hub body. A hub cover is sleeved around the elongated shaft adjacent to each enlarged end portion. The hub cover includes an inner annular member sleeved around the elongated shaft adjacent to one bearing assembly and an outer annular member sleeved around the inner annular member. The outer annular member has an inner end facing one enlarged end portion and an outer end opposite to the inner end. The inner annular member has an inner end in contact with the inner ring and kept from contacting the outer ring and the one enlarged end portion, and an outer end opposite to the inner end of the inner annular member and extending outwardly of the outer end of the outer annular member.

3 Claims, 5 Drawing Sheets

BICYCLE HUB ASSEMBLY

BACKGROUND OF THE INVENTION

1. Field of the Invention

This invention relates to a bicycle hub assembly, more particularly to an improved bicycle hub assembly which has a relatively long service life.

2. Description of the Related Art

Referring to FIG. 1, a conventional bicycle hub assembly 10 includes a hollow hub body 11 having two enlarged end portions 112. Two ball bearings 12 are mounted respectively in the enlarged end portions 112. Each of the ball bearings 12 has an inner ring 121, an outer ring 122 and balls (113a) confined between the inner and outer rings 121, 122. The outer ring 122 is in tight contact with the hub body 11. An elongated shaft 13 passes rotatably through the hub body 11 and is fixed to the inner ring 121 of each of the ball bearings 12. The elongated shaft 13 has two ends 131 extending outwardly of the hub body 11. An annular hub cover 14 is sleeved fixedly around the elongated shaft 13 adjacent to each of the enlarged end portions 112. The hub cover 14 has an inner end (14a), which contacts one of the ball bearings 12 and an outer periphery 113 of one of the enlarged end portions 112, and an outer end (14b) opposite to the inner end (14a). Since the hub cover 14 is press-fitted non-removably to the elongated shaft 13, the entire hub assembly has to be replaced even though only a ball bearing is worn out. This is not economical.

FIG. 2 shows installation of the hub assembly 10 to a fork 30. The hub assembly 10 is mounted to the fork 30 by means of a mounting unit 20. A left prong portion 31 of the fork 30 is pressed against the outer end (14b) of one hub cover 14 by means of a nut member 21 of the mounting unit 20, and a right prong portion 32 of the fork 30 is pressed against the outer end (14b) of another hub cover 14 by means of a press member 22 of the mounting unit 20. Referring also to FIG. 1, the pressure force applied on the hub cover 14 causes the hub cover 14 to abut against the adjacent ball bearing 12 and the outer periphery 113 of the hub body 11 in a relatively tight manner. Thus, the friction between the inner end (14a) and the outer periphery 113 of the hub body 11 is relatively large when the bicycle rotates, thereby countering rotation of the bicycle's wheel and wearing the hub cover 14 easily. Accordingly, the conventional hub assembly 10 cannot have a long service life.

SUMMARY OF THE INVENTION

Therefore, an objective of this invention is to provide a bicycle hub assembly with an improved structure for providing a relatively long service life.

Another objective of this invention is to provide a bicycle hub assembly having a detachable hub cover.

Accordingly, a bicycle hub assembly of this invention includes a hollow hub body having two enlarged end portions and two bearing assemblies mounted respectively in the enlarged end portions. Each of the bearing assemblies has an inner ring, an outer ring and bearing elements confined between the inner and outer rings. The outer ring is in tight contact with the hub body. An elongated shaft passes rotatably through the hub body and is fixed to the inner ring of each of the bearing assemblies. The elongated shaft has two ends extending outwardly of the hub body. A hub cover is sleeved around the elongated shaft adjacent to each of the enlarged end portions of the hub body. The hub cover includes an inner annular member sleeved around the elongated shaft adjacent to one of the bearing assemblies and an outer annular member sleeved around the inner annular member. The outer annular member has an inner end facing one of the enlarged end portions and an outer end opposite to the inner end. The inner annular member has an inner end, which is in contact with the inner ring and which is kept from contacting the outer ring and the one of the enlarged end portions, and an outer end, which is opposite to the inner end of the inner annular member and which extends outwardly of the outer end of the outer annular member.

The hub cover may be sleeved slidably and removably around the elongated shaft. The inner annular member of the hub cover has an inner annular wall that faces the elongated shaft and that is formed with an annular groove having a packing ring received therein. The packing ring is in tight contact with the elongated shaft to prevent movement between the inner annular member and the elongated shaft. The inner annular member further has an outer annular wall that faces the outer annular member and that is formed with an annular groove having a packing ring received therein. The packing ring in the outer annular wall is in tight contact with the outer annular member to prevent movement between the inner annular member and the outer annular member.

BRIEF DESCRIPTION OF THE DRAWINGS

Other features and advantages of the present invention will become apparent in the following detailed description of the preferred embodiment, with reference to the accompanying drawings, in which.

DETAILED DESCRIPTION OF THE PREFERRED EMBODIMENT

Figure 1:
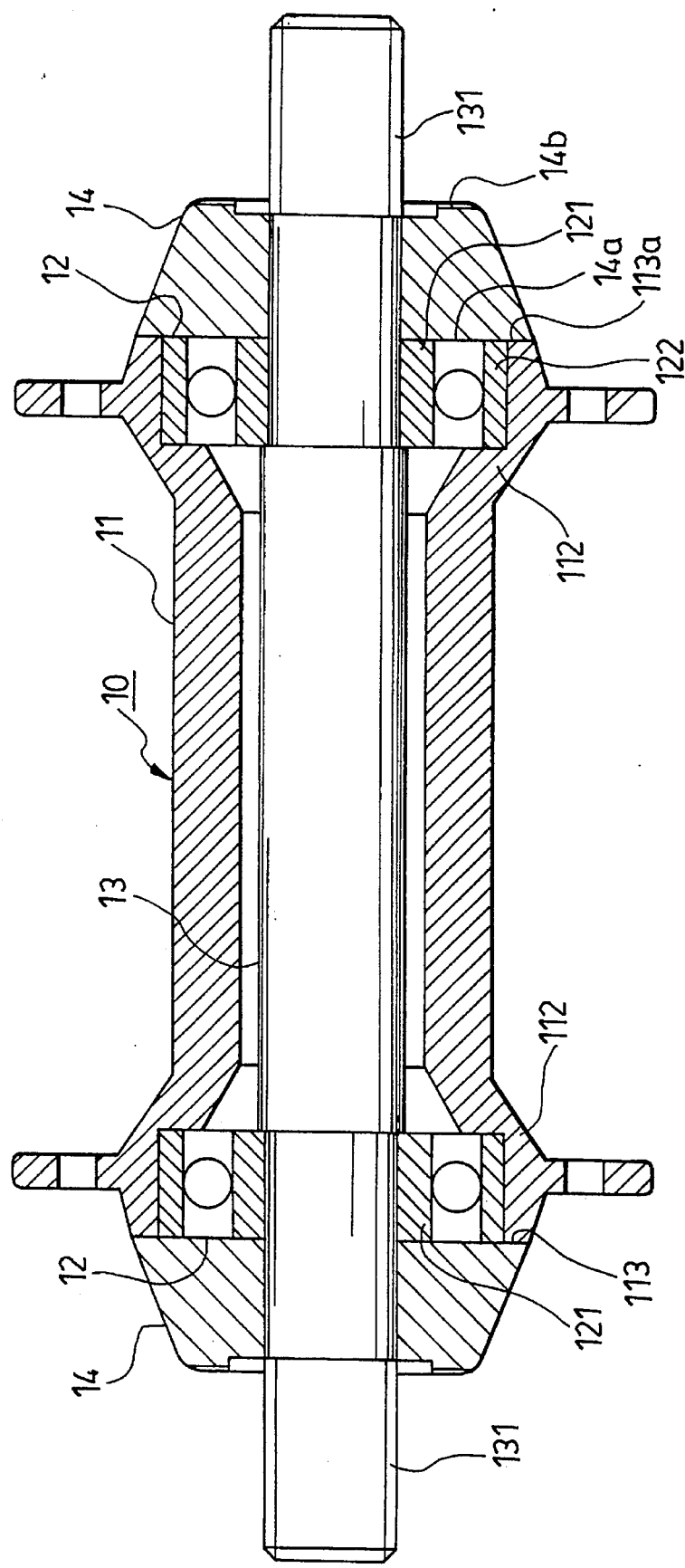
FIG. 1 is a sectional view of a conventional hub assembly.
Figure 2:
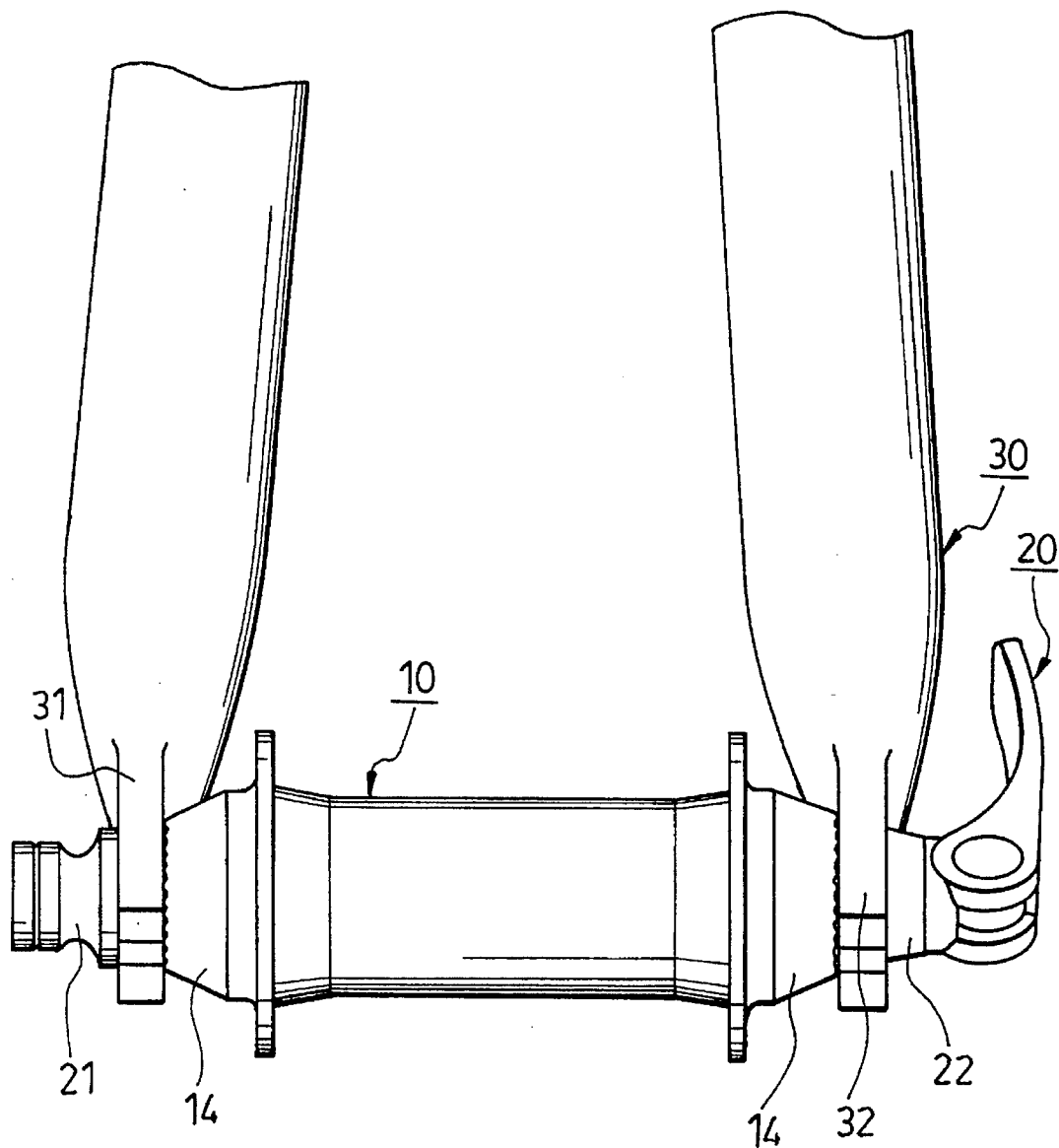
FIG. 2 is an assembled view of the conventional hub assembly when mounted on a fork.

Before the present invention is described in greater detail, it should be noted that like elements are indicated by the same reference numerals throughout the specification.

Figure 3:
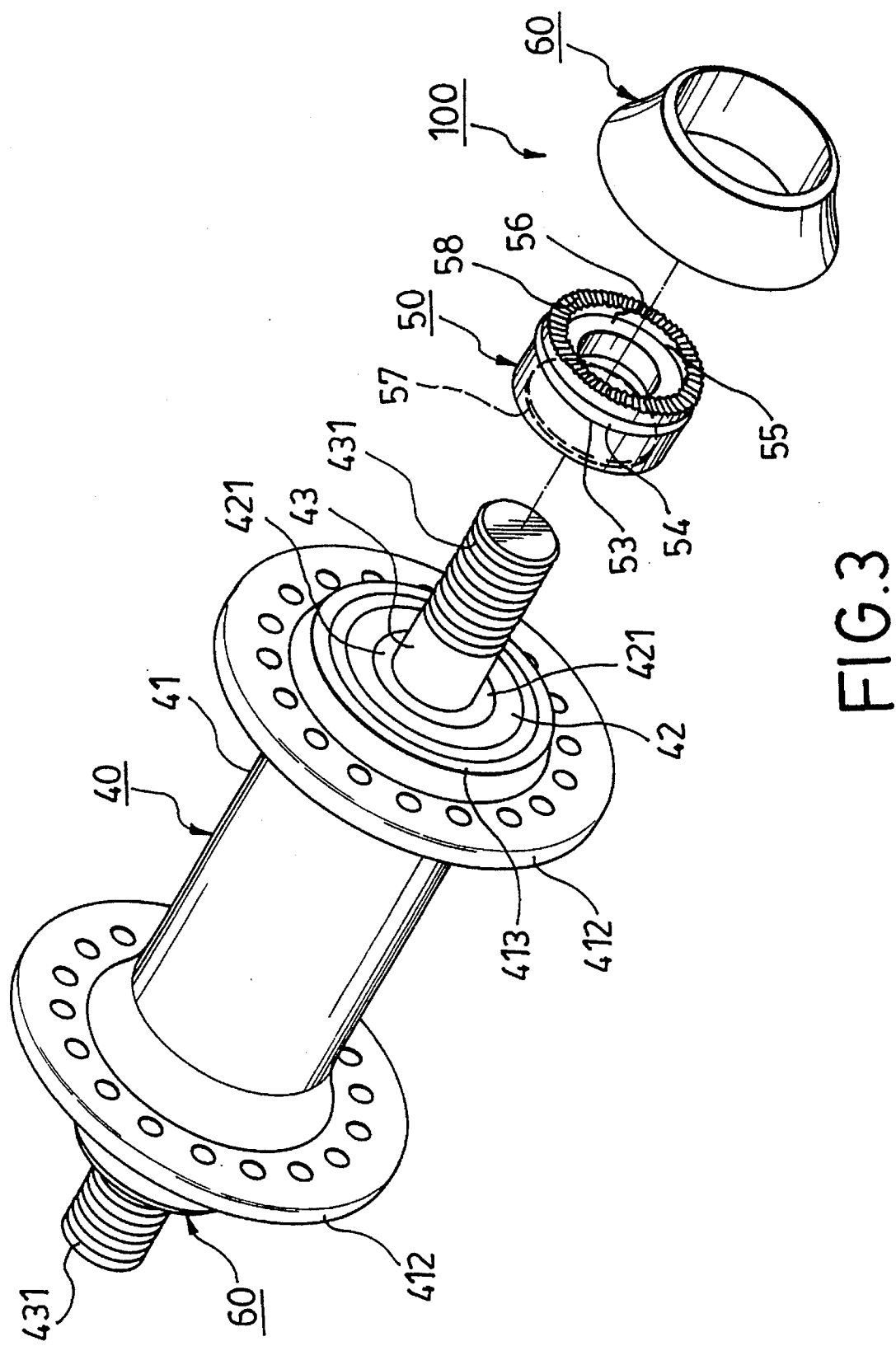
FIG. 3 is a partly exploded view of a hub assembly of this invention.
Figure 4:
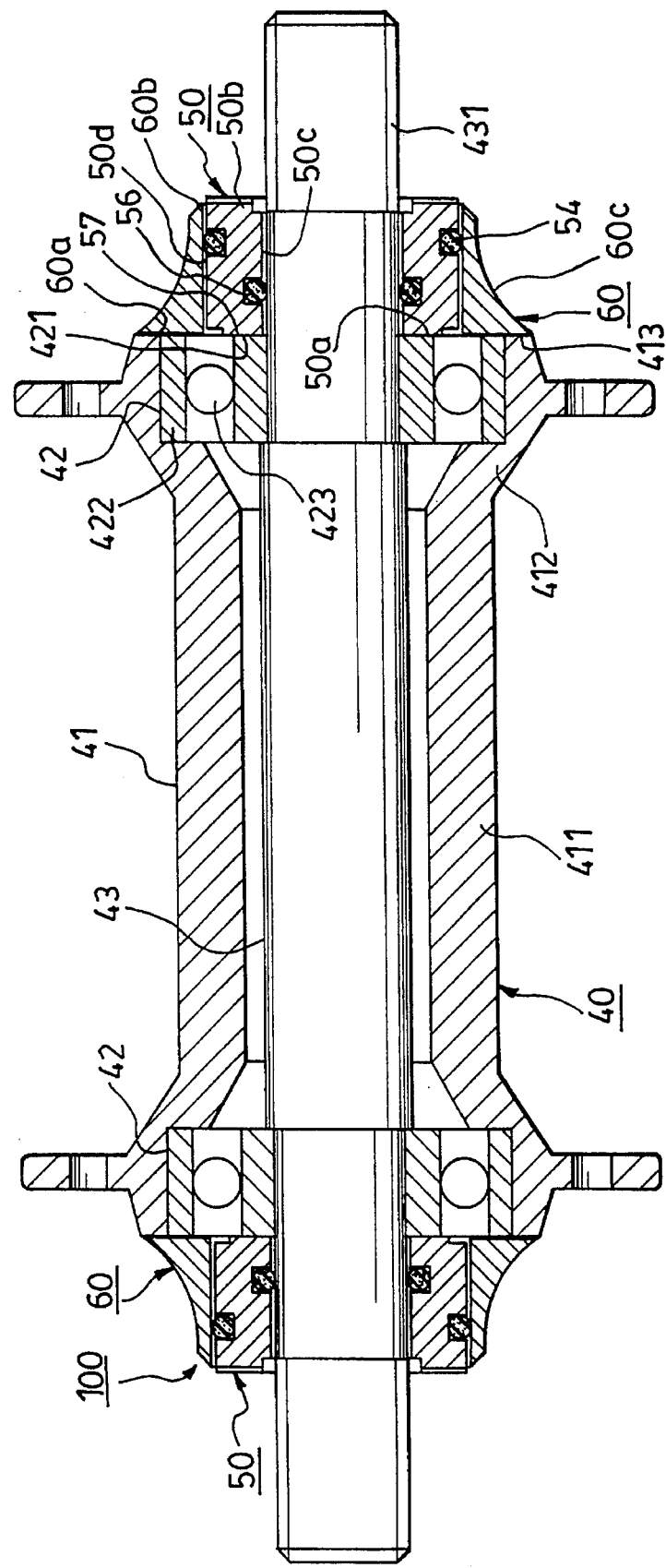
FIG. 4 is a sectional view of the hub assembly of this invention.

Referring to FIGS. 3 and 4, the preferred embodiment of a hub assembly 40 of this invention includes a hollow hub body 41 with two enlarged end portions 412. Two ball bearings 42 are mounted respectively in the enlarged end portions 412. Each of the ball bearings 42 has an inner ring 421, an outer ring 422 and balls 423 confined between the inner and outer rings 421, 422. The outer ring 422 is in tight contact with the hub body 41.

An elongated shaft 43 passes rotatably through the hub body 41 and is fixed to the inner ring 421 of each of the ball bearings 42. The elongated shaft 43 has two ends 431 extending outwardly of the hub body 41.

A hub cover 100 is sleeved slidably and removably around the elongated shaft 43 adjacent to each of the enlarged end portions 412 of the hub body 41. The hub cover 100 includes an inner annular member 50 sleeved around the elongated shaft 43 adjacent to the ball bearing 42 and an outer annular member 60 sleeved around the inner annular member 50. The outer annular member 60 has an inner end (60a), which contacts an outer periphery 413 of the enlarged end portion 412 and the outer ring 422 of the ball bearing 42, and an outer end (60b) opposite to the inner end (60a). The outer annular member 60 further has an outer annular wall (60c) converging from the inner end (60a) toward the outer end (60b). The inner annular member 50 has an inner end (50a) with a constricted portion 57 in contact with the inner ring 421 and an outer end (50b) opposite to the inner end (50a). It is noted that the inner end (50a) is kept from contacting the outer ring 422 and the outer periphery 413 of the hub body 41 and that the outer end (50b) extends outwardly of the outer end (60b) of the outer annular member 60. The outer end (50b) is formed with angularly spaced teeth 58. In addition, the inner annular member 50 has an inner annular wall (50c) that faces the elongated shaft 43 and that is formed with an annular groove 55 having a packing ring 56 received therein. The packing ring 56 is in tight contact with the elongated shaft 43 to prevent movement between the inner annular member 50 and the elongated shaft 43. The inner annular member 50 has an outer annular wall (50d) that faces the outer annular member 60 and that is formed with an annular groove 53 having a packing ring 54 received therein. The packing ring 54 is in tight contact with the outer annular member 60 to prevent movement between the inner annular member 50 and the outer annular member 60. In this way, the inner and outer annular members 50, 60 are attached firmly and removably to the elongated shaft 43.

Figure 5:
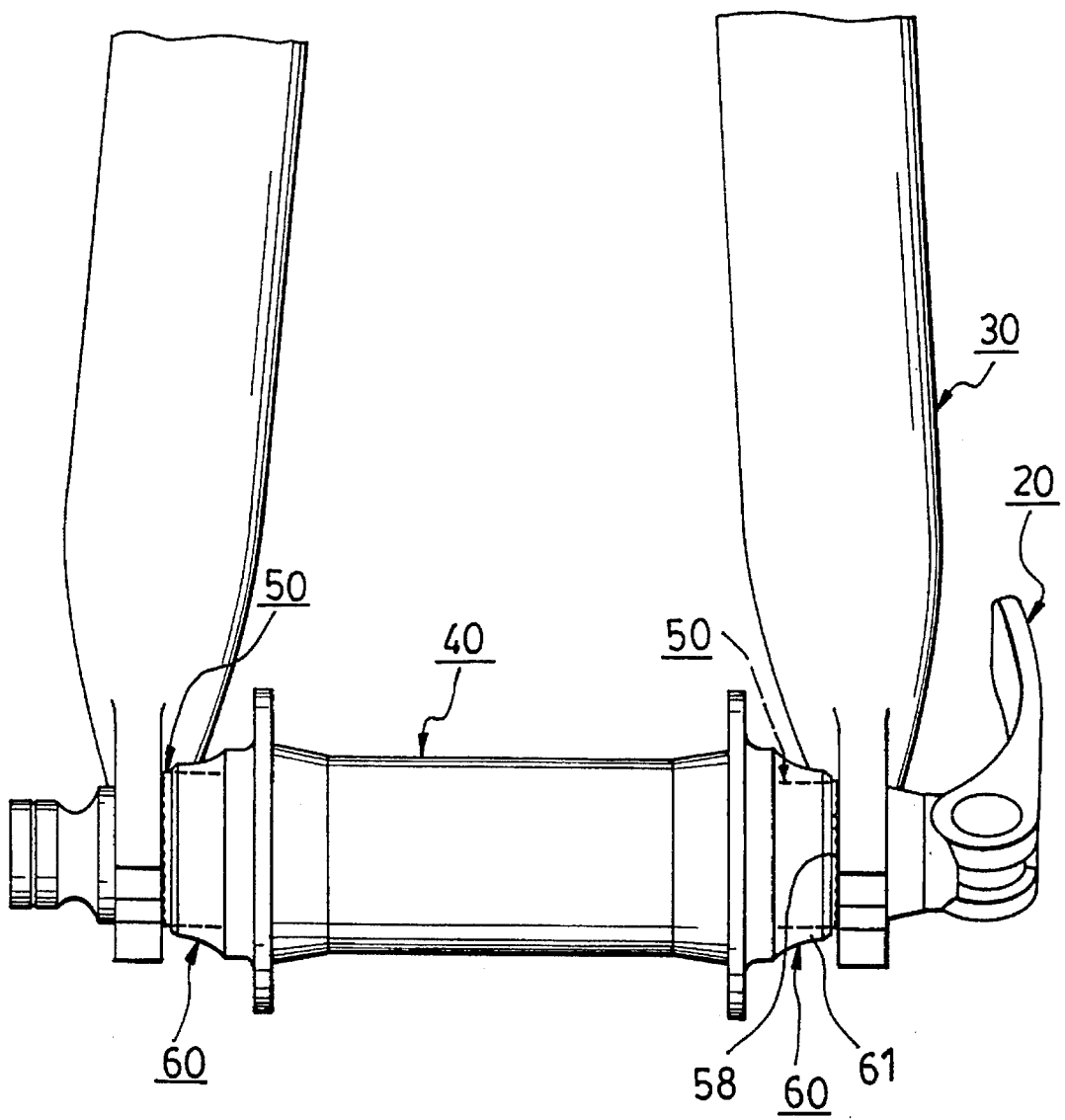
FIG. 5 is an assembled view of the hub assembly of this invention when mounted on a fork.

FIG. 5 shows installation of the hub assembly 40 to a fork 30. The hub assembly 40 is mounted to the fork 30 by means of a mounting unit 20. Since the outer end (50b) of the inner annular member 50 extends outwardly of the outer end (60b) of the outer annular member 60, the fork 30 is pressed against the outer ends (50b) of the inner annular members 50 by the mounting unit 20 when the fork 30 is mounted to the hub assembly 40. In this way, the pressure force is applied only on the inner annular members 50 and not on the outer annular members 60. Thus, the friction between the inner end (60a) of the outer annular member 60 and the outer periphery 413 of the hub body 41 does not increase considerably when the bicycle's wheel rotates so that the outer annular member 60 does not wear easily. Accordingly, a bicycle provided with the hub assembly 40 of this invention can run more smoothly than a bicycle provided with the conventional hub assembly 10, and the hub assembly 40 can have a relatively long service life compared to the conventional hub assembly 10.

In addition, since the hub cover 100 of the present invention is mounted detachably to the elongated shaft 43, only a new ball bearing is required when an old ball bearing is worn out. Therefore, the use of the hub assembly 40 is more economical than that of the conventional hub assembly 10.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A bicycle hub assembly, comprising:

a hollow hub body having two enlarged end portions;

two bearing assemblies mounted respectively in said enlarged end portions, each of said bearing assemblies having an inner ring, an outer ring and bearing elements confined between said inner and outer rings, said outer ring being in tight contact with said hub body;

an elongated shaft passing rotatably through said hub body and fixed to said inner ring of each of said bearing assemblies, said elongated shaft having two ends extending outwardly of said hub body; and a hub cover sleeved around said elongated shaft adjacent to each of said enlarged end portions of said hub body, said hub cover including an inner annular member sleeved around said elongated shaft adjacent to one of said bearing assemblies and an outer annular member sleeved around said inner annular member, said outer annular member having an axial inner end facing one of said enlarged end portions and an axial outer end opposite to said axial inner end, said inner annular member having an axial inner end, which is in contact with said inner ring and which is kept from contacting said outer ring and said one of said enlarged end portions, and an axial outer end, which is opposite to said axial inner end of said inner annular member and which extends outwardly of said axial outer end of said outer annular member.

2. A bicycle hub assembly as claimed in claim 1, wherein said hub cover is sleeved slidably and removably around said elongated shaft, said inner annular member of said hub cover having a radial inner annular wall that faces said elongated shaft and that is formed with an annular groove having a packing ring received therein, said packing ring being in tight contact with said elongated shaft to prevent movement between said inner annular member and said elongated shaft, said inner annular member further having a radial outer annular wall that faces said outer annular member and that is formed with an annular groove having a packing ring received therein, said packing ring in said radial outer annular wall being in tight contact with said outer annular member to prevent movement between said inner annular member and said outer annular member.

3. A bicycle hub assembly as claimed in claim 1, wherein said axial outer end of said inner annular member is formed with angularly spaced teeth, said axial inner end of said inner annular member having a constricted portion in contact with said inner ring of said one of said bearing assemblies.

* * * * *